(12) United States Patent
Ye et al.

(10) Patent No.: US 7,494,692 B2
(45) Date of Patent: Feb. 24, 2009

(54) ANTIOXIDATION COATING FOR STEEL AND ANTIOXIDATION METHOD USING THE SAME

(75) Inventors: Shufeng Ye, Beijing (CN); Lianqi Wei, Beijing (CN); Yusheng Xie, Beijing (CN); Yunfa Chen, Beijing (CN); Jianping Qiu, Dalian (CN); Dejun Zou, Dalian (CN); Ze Zhang, Dalian (CN); Yingkun Zou, Dalian (CN)

(73) Assignees: Institute of Process Engineering, Chinese Academy of Science, Beijing (CN); Dalian Rino Environment Engineering Science and Technology Co., Ltd., Dalian City ( * ) Notice: Subject to any disclaimer, the term of this patent is extended or adjusted under 35 U.S.C. 154(b) by 0 days.

(21) Appl. No.: 12/062,246

(22) Filed: Apr. 3, 2008

(65) Prior Publication Data

US 2008/0233295 A1    Sep. 25, 2008

Related U.S. Application Data

(63) Continuation of application No. PCT/CN2007/000339, filed on Jan. 31, 2007.

(51) Int. Cl.
*B05D 3/02*      (2006.01)
*C09K 15/00*    (2006.01)
*C09K 15/04*    (2006.01)
*C09D 1/00*      (2006.01)

(52) U.S. Cl. .............. 427/372.2; 252/397; 252/399; 106/286.3

(58) Field of Classification Search ............. 106/286.3; 427/372.2
See application file for complete search history.

(56) References Cited

U.S. PATENT DOCUMENTS

| | | | | |
|---|---|---|---|---|
| 3,793,003 | A | * | 2/1974 | Othmer ...................... 75/674 |
| 3,802,866 | A | * | 4/1974 | Rinesch et al. ............... 75/543 |
| 3,876,749 | A | * | 4/1975 | Horvath et al. .............. 75/500 |
| 3,957,673 | A | * | 5/1976 | Umezono et al. ........... 252/178 |
| 4,374,743 | A | * | 2/1983 | Stockel ....................... 252/70 |
| 4,519,915 | A | * | 5/1985 | George et al. ............... 210/663 |
| 4,568,657 | A | * | 2/1986 | Sepulveda et al. ........... 502/81 |

(Continued)

FOREIGN PATENT DOCUMENTS

CN    1036396    10/1989

(Continued)

OTHER PUBLICATIONS

International Search Report mailed on Feb. 8, 2007, in corresponding PCT Application Serial No. PCT/CN/2007/000339, 4 pages.

*Primary Examiner*—Randy Gulakowski
*Assistant Examiner*—Robert Loewe
(74) *Attorney, Agent, or Firm*—Hanley, Flight & Zimmerman, LLC.

(57) ABSTRACT

The present disclosure relates to an antioxidation coating for steel. In one example, the coating is produced by mixing magnesian mineral, layered silicate, metallurgical solid waste, aluminum powder, organic thickener and inorganic binder including the components of $Al_2O_3$, $SiO_2$, $MgO$, $CaO$, $Fe_2O_3$ or the like with water, and the final coating density is adjusted to 1,100~1,500 kg/m$^3$ by adding water.

15 Claims, 2 Drawing Sheets

U.S. PATENT DOCUMENTS

| | | | | |
|---|---|---|---|---|
| 4,740,239 A * | 4/1988 | Tuovinen et al. | ............... | 75/503 |
| 2002/0037798 A1* | 3/2002 | Watanabe et al. | .............. | 501/80 |
| 2002/0132722 A1* | 9/2002 | Raichel et al. | ............... | 501/155 |
| 2003/0083187 A1* | 5/2003 | Juul et al. | ..................... | 501/27 |
| 2003/0099062 A1* | 5/2003 | Kataoka et al. | ........... | 360/99.12 |
| 2003/0131759 A1* | 7/2003 | Francis et al. | ............ | 106/286.1 |
| 2003/0181306 A1* | 9/2003 | Bernard et al. | ................ | 501/36 |
| 2004/0253321 A1* | 12/2004 | Fechner et al. | .............. | 424/642 |
| 2005/0096209 A1* | 5/2005 | Kase et al. | .................... | 501/56 |
| 2005/0107238 A1* | 5/2005 | Li | ............................... | 501/35 |
| 2006/0042319 A1* | 3/2006 | Nykiel et al. | .............. | 65/134.8 |

FOREIGN PATENT DOCUMENTS

| | | |
|---|---|---|
| CN | 1071705 | 5/1993 |
| CN | 1179448 | 4/1998 |
| CN | 1300805 | 5/2003 |
| CN | 1450131 | 10/2003 |
| CN | 1510089 | 7/2004 |
| CN | 1632137 | 6/2005 |
| EP | 0045207 | 2/1982 |
| EP | 0466491 | 1/1992 |
| JP | 56044716 | 4/1981 |
| SU | 1474116 | 4/1989 |

* cited by examiner

ANTIOXIDATION COATING FOR STEEL AND ANTIOXIDATION METHOD USING THE SAME

CROSS REFERENCE TO RELATED APPLICATIONS

This patent is a continuation-in-part of International Patent Application PCT/CN2007/000339, filed on Jan. 31, 2007, the entire content of which is hereby expressly incorporated by reference.

TECHNICAL FIELD

This disclosure pertains generally to coatings and, more particularly, antioxidation coatings for steel and antioxidation methods using the same. In some examples, such coatings and methods are used to prevent oxidation of steel, particularly during hot-rolling of the steel so as to reduce oxidation loss of the steel.

BACKGROUND

Generally, steel must be heated to approximately 1,250° C. for a long time in a heating furnace before hot-rolling of the steel may be carried out. The protracted heating process results in serious oxidation loss to the steel surface. That is, in the absence of antioxidation measures, a thick scale of iron oxide forms on the surface of the steel. This scale must be removed from the surface of the steel using a sometimes uneven process. Commonly, the loss rate due to oxidation during the heating process can reach up to 0.5%~2.5%. This not only reduces productivity in the processing of the steel, but affects the surface quality of steel.

Applying an antioxidation coating to the steel surface to reduce the oxidation loss forms a protective layer on the steel surface by which oxidation/decarbonization of the steel surface can be prevented during the heating process. During the subsequent cooling process, the protective layer is peeled off to decrease the thickness of the iron scale, thereby increasing productivity and improving the quality of the steel surface.

For effective reduction of oxidation loss, the antioxidation coating must form a complete and dense protective layer that must be adaptable the high-temperatures in the heating furnace and then can be peeled off easily along with the iron scale after the steel is discharged from the furnace. Furthermore, it is desirable to reduce the thickness of the iron scale as much as possible so that metallic luster of the steel surface can be retained after heat treatment.

There have been many reports on the research about this type of antioxidation coating, for example, Chinese Patent CN1632137A describes a protective coating material that could be used to prevent oxidation/decarbonization of the steel workpiece during heat treatment. The coating is composed of: glass powder 10%~20%, quartz sand 30%~33%, silica sand 20%~23%, Al2O3 20%~24%, and C 2%~10%. The coating is applied to effect antioxidation/decarbonization of various types of steel heated to 800~1200° C. for 4~10 hours and is able to peel spontaneously during a subsequent cooling process. Accordingly, the surface of the steel workpiece maintains its original metallic luster after heat treatment, and the surface layer also maintains its original chemical components. According to the description of CN1632137A, this coating material is convenient to use and has excellent antioxidation/decarbonization effectiveness and wide applicability. However, this coating material has limited application because the coating material must be applied at a temperature lower than 1200° C. Thus, the operation of the heating furnace is limited during the use of this coating. That is, in order to apply this coating material, it is essential that the hot steel be cooled previously, then coated with the coating material, and afterwards re-heated for hot-rolling. Such additional processing consumes both additional energy and time.

Chinese Patent CN1300805A describes a high-temperature antioxidation coating prepared by mixing 50~62 parts of SiO2, 12~20 parts of Al2O3, 2~8 parts of Fe2O3, 1~5 parts of MgO, 2~7 parts of CaO, 2~6 parts of Na2O, 2~6 parts of K2O, and 1~5 parts of FeO. The mixture is then melted in a kiln at 800~1300° C. for 3 hours to form an enamel that is then cooled. The cooled enamel is then pulverized with the addition of a small amount of spinel, clay, and water, and finally ground to obtain a particle size of less than 180 mesh. Such coating particles are fine and in a form of a suspension, thus hardly depositing; at the same time, the coating is simple to use without requiring vertical roll side-pressure equipment, can be used at a temperatures of 900~1200° C. and is low cost. However, the technology and processing to produce this coating is rather complicated because the coating components first must be melted to form enamel and then cooled and pulverized, leading to time and energy consumption. Furthermore, the application temperature of this coating is lower than 1200° C. so that the coating cannot be directly applied at the heat treatment temperature before the common steel is hot rolled.

Chinese Patent CN1179448A describes a high temperature refractory antioxidation coating for steel that mainly consists of precipitated barium carbonate and silica, in addition to boric acid as fluxing agent and soluble glass as medium. Under the high temperatures, this coating material forms a continuous ceramic glaze which has excellent spreading properties with no stripping, no gasification and no dropping, and good antioxidation protection to prevent the refractory steel from oxidizing in long-term use. However, this coating is oriented specifically at protecting refractory steel from oxidizing at high temperatures, and is used for a surface of the refractory steel for smelting metal magnesium. Moreover, the coating is used with heating only when it is sprayed at normal temperature and then forms a dried film spontaneously, and thus does not have broad applicability.

Chinese Patent CN1036396A describes an antioxidation coating for MgO-Cr2O3-based silicon steel slab. The coating uses industrial magnesia as main raw material, is low cost and easy to produce without any cleaning treatment for the slab before using it, and has excellent thermal conductivity and high temperature resistance. The application of this coating does not result in an extend heating time and a negative effect on the finished product quality of the silicon steel, and can effectively prevent the oxidation loss of the silicon steel in heating; furthermore, the furnace throughput can be improved and the primary rolling capacity can be increased greatly. However, this coating is oriented specifically at protecting silicon steel from oxidizing at high temperatures, and thus has no broad applicability.

It can be seen that the current antioxidation coatings have good high temperature antioxidation effect on the certain steels to some extent, but each of the protection temperatures was at most 1200° C., and therefore the applications of these coatings were limited. Moreover, the steel must be cooled before the coating is applied, thereby increasing energy consumption. As far as the prior art, there is still room both to raise the coating temperature of the coating on the steel surface and to raise the protection temperature of the coating layer. In addition, glass powder-based substances are often used as the sticking medium in the present coatings in order to ensure the coating performance, but preparation of these glass powder-based substances requires complicated technology such as high temperature sintering, shredding and grinding to prepare such glass powders, complicating the initial preparation process of these coatings.

BRIEF DESCRIPTION OF THE DRAWINGS

FIG. 1(a) shows the coating layer formed from the coating according to known processing, and FIG. 1(b) shows the coating layer formed as described in the examples herein.

FIG. 2(a) shows the SEM appearance of the iron scale in the case of no using coating, and FIG. 2(b) shows the SEM appearance of the iron scale in the case of using the coating of the Example 1.

DETAILED DESCRIPTION

Figure 1:
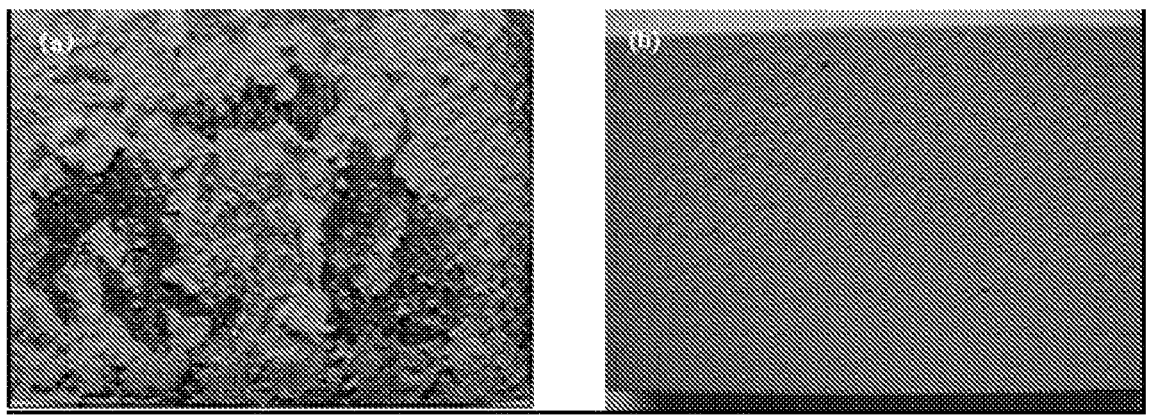
FIG. 1 shows the comparison of the coating layer formed from the antioxidation coating according to the examples provided herein and the coating layer formed from a known antioxidation coating, wherein both coatings were sprayed on the steel surface at 800° C. In particular.

Hereinafter, the invention will be described in detail with reference to specific Examples. Although certain apparatus constructed in accordance with the teachings of the invention have been described herein, the scope of coverage of this patent is not limited thereto. On the contrary, this patent covers every apparatus, method and article of manufacture fairly falling within the scope of the appended claims, either literally or under the doctrine of equivalents As described in detail below, at least some of the examples described herein provide an antioxidation coating for steel that is applicable to high-temperature treatments to solve the above problems present in the prior art. The example coatings described herein can be directly sprayed on the steel surface to form a protective layer and have higher protection temperature so as to reduce the oxidation loss of the steel during heat treatment and to raise the productivity of the manufacturing process, as well as to improve the surface quality of the steel product.

In addition, at least some of the examples provided herein provide a method for preparing the above antioxidation coating for steel that is applicable to high-temperature treatment. At least some of the advantages associated with these examples include the use of inexpensive raw materials, even metallurgical wastes and minerals, simplified technology, improved coating performances and reduced cost.

Examples described herein also provide methods for protecting steel against oxidation in high-temperature treatment. The antioxidation coatings described herein have a broader range of application temperatures and, thus, are much more practical use.

As described in the examples below, the examples provided herein provide antioxidation coatings for steel. In some examples the coating is a slurry prepared by mixing magnesian mineral, layered silicate, metallurgical solid waste, aluminum powder, organic thickener and inorganic binder as primary raw materials with water. Example coatings may include the following chemical components on the basis of the dry powder of said coating:

| | |
|---|---|
| $Al_2O_3$ | 15~32 wt % |
| $SiO_2$ | 20~40 wt % |
| $MgO$ | 10~35 wt % |
| $B_2O_3$ | 0~20 wt % |
| $P_2O_5$ | 0~10 wt % |
| $CaO$ | 4~15 wt % |
| $Fe_2O_3$ | 2~20 wt % |
| C | 1~5 wt % |
| $Na_2O$ | 0~10 wt % |

In some examples, the coating density is roughly 1,100~1,500 kg/m3.

The example antioxidation coatings described herein for steel a have very broad range of application temperatures when it is applied to the processing procedures used in the heating furnace. The example coatings can not only be sprayed or coated on the steel surface at normal temperature to form a dried film, but may be sprayed directly onto the red-hot steel surface at high temperatures of up to 1,000° C. and then formed into a continuous and dense protective layer that can withstand a furnace temperatures of up to 1,300° C. Therefore, the example coatings can effectively reduce the high-temperature oxidation loss that occurs during transportation of the slab before hot-rolling and during the soaking process, without changing the inherent performance of the steel substrate.

The example main raw materials for providing the chemical components as mentioned in the examples above include:

Magnesian mineral, which may be selected from one or more of magnesite powder, dolomite powder, industrial magnesia or the like;

Metallurgical solid waste, which may be one or more of iron scale, red mud or the like;

Organic thickener, which may be one or more of carboxymethyl celluloses, polyvinyl alcohols or the like;

Layered silicate, which may be comprised of one or more of vermiculite, diatomite, rectorite, mica or the like;

Inorganic binder, which can be selected from one or more of borax, soluble glass and aluminum phosphate binder as well as the modified product thereof.

To obtain the aluminum oxide content needed in this coating and to protect the steel, one raw material may be, for example, aluminum powder. Theoretically, pure aluminum powder may be used, but in one example, it is best to use all industrial grades of aluminum powder in industrial production to ensure the coating effectiveness and to reduce cost simultaneously.

The selection of the magnesian mineral, metallurgical solid waste, layered silicate, organic thickener, and inorganic binder in above mentioned raw materials should not be limited to the listed above, rather depending on the chemical components as needed. Because there may be component differences between the raw materials, the blending ratio and the selection of the raw materials are correlated with each other, provided that the composition of the main components as required can be obtained and other trace components can be ignored.

The coating is, for example, a slurry having certain fluidity that can be applied on the surface of the steel substrate at different temperatures by coating or spraying. In one example, the raw materials each have the particle size of at most 100 mesh in order to disperse the components of the coating system evenly and avoid clogging nozzles when spraying.

Preparing the example coatings described herein is very simple. For example, such a process may include determining the blending ratio of the raw materials according to the required chemical components, formulating powder of 100 mesh or less by mixing, blending uniformly and then adding water to form a slurry with density of 1,100~1,500 kg/m3.

Because most of the raw materials used in the examples described herein are readily available and inexpensive minerals, even metallurgical waste, production costs can be remarkably reduced over known methods and techniques.

The example antioxidation coatings described herein have wide applicability. That is to say, the coating is applicable to heat treatment of various types of the steel such as common steel and all types of alloy steel; moreover, there is no need to cool the steel in advance when using the example coatings described herein, and therefore said coating can be more widely used within various industries.

Another aspect of the examples described herein provides a technology for protecting the steel against oxidation: the antioxidation coating described herein is sprayed onto the surface of the steel obtained from the continuous casting and continuous rolling before the steel (slab) is placed in the heating furnace, and then a uniform and continuous coating layer is formed on the steel surface by applying the invention coating to the steel substrate at no more than 1,000° C. Because the dense and firm coating layer can be formed on the steel surface immediately after the coating is sprayed, the steel can be directly applied to the heating furnace and worked without drying procedure. The resulting protective layer provided by the examples herein prevents oxidation loss even if the steel is subjected to heat treatment at a temperature of 800~1300° C. for 2~10 hours in the heating furnace. The coatings described herein, along with a small amount of iron scale, can easily be peeled off upon removal of the steel from the furnace.

It is enough to install spray equipment in the forepart of the heating furnace into which the steel will be inserted to use the above methods. Especially for the red-hot steel, spraying can be directly carried out at high temperatures so as to achieve remarkable energy saving, which is distinct from the existing coating technologies that must be applied at normal temperature.

The coatings described herein can also be applied to steel at normal temperature before hot-rolling, namely, the coating is sprayed or coated onto the steel surface at normal temperature, and then formed into a dried film and subjected to heat treatment in the furnace.

In conclusion, the antioxidation coatings described in the examples provided herein have special chemical compositions and properties, and the high-temperature antioxidation effect obtained by using the same is better than previously used techniques. At least some of the example coatings described herein have the multiple advantages as compared with known coatings.

First, the antioxidation coatings described in the examples provided herein can be directly sprayed onto the surface of the red-hot steel of up to 1,000° C., and then the functional components and the binder in the coating can be polymerically bonded to each other on the substrate surface intermediately while volatilizing water from the system so that a dense coating layer is formed by the heat of the steel itself. In practical use, these antioxidation coatings can be directly sprayed onto a surface of red-hot steel before the steel is inserted into the heating furnace in the hot rolling workshop. Because a continuous or substantially continuous protective layer can be formed under the high temperature by applying this coating, it effectively reduces high-temperature oxidation loss occurring during slab transportation before hot-rolling and the soaking process, without changing the inherent performance of the steel substrate. Moreover, the coatings described in the examples each have excellent ability to peel spontaneously after completion of the heating. The coatings described herein have greatly improved practicability, reduced energy consumption in metallurgy and shortened work times as compared with the ordinary coatings that must be applied at normal temperature and then subjected to heat treatment after air drying.

FIG. 1(a) shows the result of a known coating layer sprayed on the steel surface at high temperature. By contrast, FIG. 1(b) shows the result of the example coating layer described herein sprayed directly on the surface of the red-hot steel, wherein the spraying temperatures each are 800° C. It can be seen in FIG. 1(a) that a very incomplete coating layer formed using the known coating, while a very complete and uniform coating layer formed using the example coatings described herein as shown in FIG. 1(b). Such a result indicates that the coatings described in the examples provided herein can be used to form a uniform and complete coating layer on a surface of the hot steel.

Certainly, the antioxidation coatings described herein can also be coated onto the steel surface at normal temperature if needed, and then formed into a dense and complete protective layer during the heat treatment, similar to application at high temperatures.

Second, the example antioxidation coatings described herein can be applied to provide antioxidation functionality to various types of steel such as plain carbon steel and all types of alloy steel that are heated at 800~1,300° C. for 2~10 hours. After heat treatment, the coating layer can peel from the steel very easily, leaving a smooth surface of the steel slab with no decarbonization or alloy element loss. Because a protective layer formed from the coating can be more dense and firm due to adsorption between the coating and the substrate surface during the heat treatment at a temperature of 800~1,300° C., environmental oxidative gas permeation can be effectively prevented, and oxidation and decarbonization can be inhibited. Because the coating layer is in sintering state throughout, the inorganic binder in the system can firmly bind to the other functional components via high temperature process so as to seal the steel surface completely or substantially completely. Furthermore, the thermal expansion coefficient of the example coating layer is distinct from that of the substrate in the steel surface, thus the coating layer can easily peel spontaneously during cooling immediately after the steel was discharged from the furnace.

Third, most of the raw materials used in the example antioxidation coatings described herein for use on steel are readily available and cheap, especially including metallurgical wastes and minerals, which leading to resource utilization of wastes, that is, to turn rubbish into wealth. Moreover, the example techniques and materials described herein will make antioxidation more practicable with low coating cost as compared with the existing technologies in which the antioxidation coating was prepared by employing the requirement specific to the raw materials.

Fourth, the example antioxidation coatings described herein for use on steel can be directly sprayed onto the red-hot slab obtained from the continuous casting procedure and subsequently charged into the heating furnace by installing spraying equipment in the forepart of the heating furnace without affecting the existing technology in metallurgy field, leading to reducing the high temperature oxidation loss by 50~80% and increasing productivity and output, and therefore the economic and social benefits are remarkable.

The following examples are provided:

EXAMPLE 1

Dolomite powder, vermiculite powder, red mud, industrial aluminum powder, borax, sodium carboxymethyl cellulose, and soluble glass were mixed together in which the chemical compositions on the basis of the dry powder coating were 20% $Al_2O_3$, 34% $SiO_2$, 21% MgO, 5% $B_2O_3$, 10% CaO, 5% $Fe_2O_3$, 2% C, 3% $Na_2O$. The resultant mixture was pulverized to 100 mesh or less, and then water was added therein to adjust the final density of the coating slurry to 1,100 kg/m3, thereby the high temperature antioxidation coating of Example 1 was obtained.

The coating of Example 1 was sprayed onto the surface of Q235-B steel through spraying equipment disposed in the forepart of the heating furnace before the steel was inserted into the heating furnace, immediately forming a gray protective layer with the surface temperature of the steel at 800° C. (see FIG. 1). After the steel was heat-treated at 1250° C. for 2 hours in the furnace, there formed only a very thin iron scale with excellent compactness on the steel surface due to the protective coating layer. Because the coating layer can peel spontaneously by instantaneous cooling, the substrate surface remained uniform and clean, leaving no residue.

Figure 2:
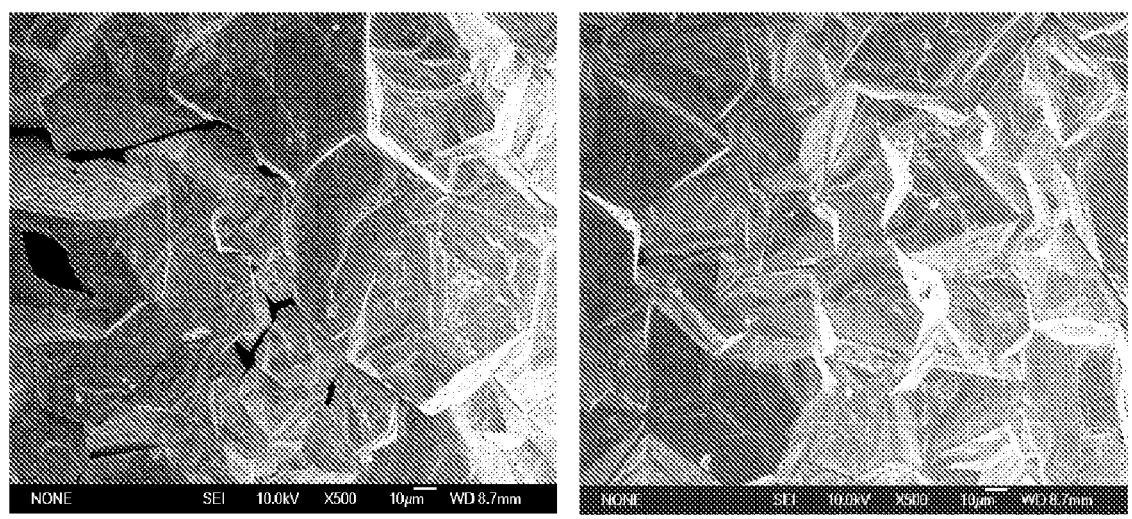
FIG. 2 shows a scanning electron microscope (SEM) appearance of iron scale after a steel surface was subjected to heat treatment at 1250° C. In particular.
Figure 3:
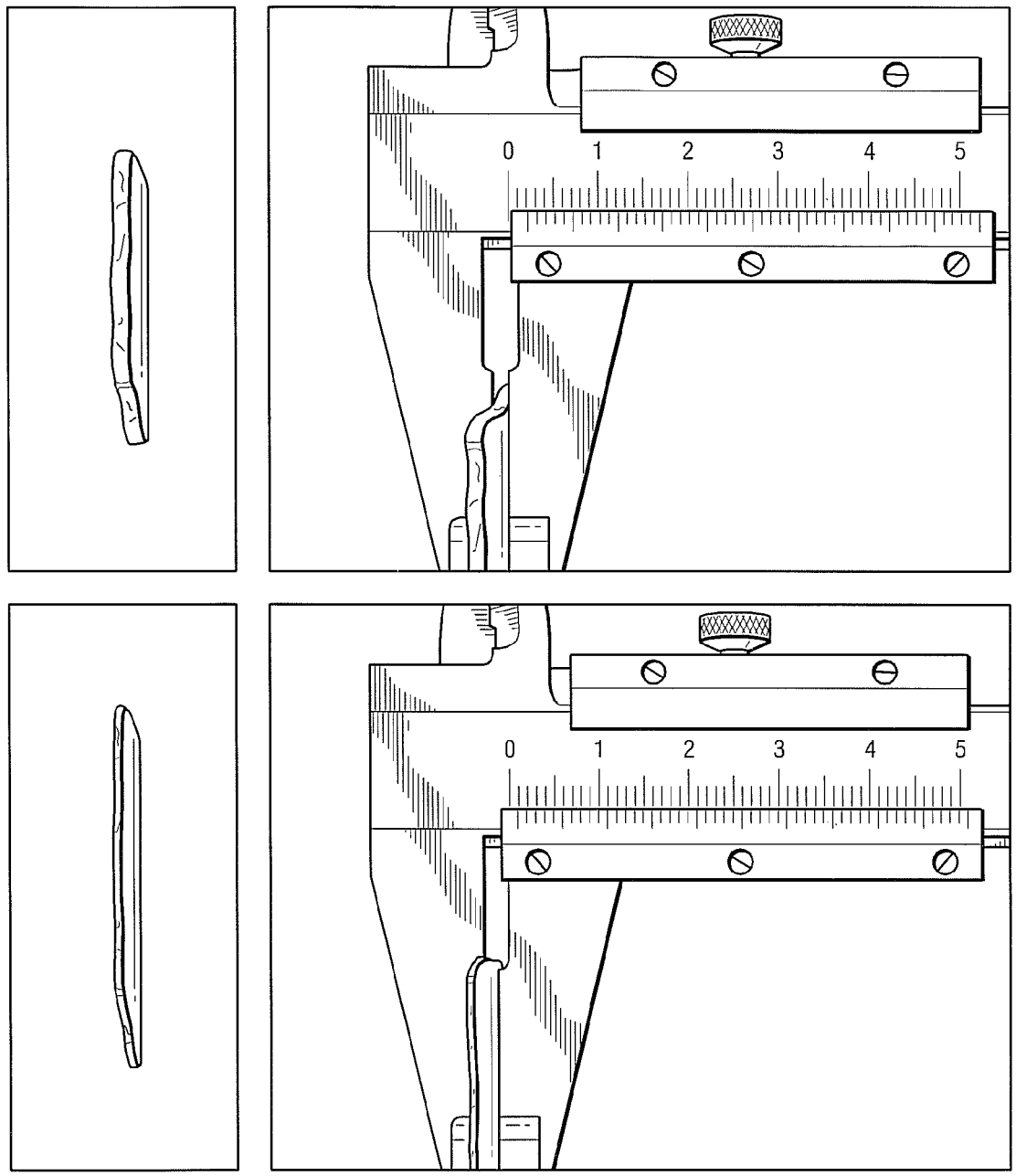
FIG. 3 shows the thickness comparison in two different iron scales, wherein the upper portion of FIG. 3 is the photo in which the thickness of the iron scale is shown with no antioxidation coating, and the bottom portion of FIG. 3 is the photo in which the thickness of the iron scale is shown with using an antioxidation as described in the examples provided herein.

With reference to FIGS. 2 and 3 showing the SEM appearance results and the respective thicknesses of the iron scale, it can be seen that the steel having a protective coating layer formed from the coating of Example 1 had much thinner iron scale than the steel without a protective coating layer. Moreover, it displayed a 70% or more reduction in oxidation loss. Furthermore, the coating can peel spontaneously from the substrate surface by cooling, thereby the substrate surface remains uniform and clean, leaving no residue.

EXAMPLE 2

After magnesite powder, rectorite powder, red mud, industrial aluminum powder, sodium carboxymethyl cellulose, and soluble glass in which the chemical compositions on the basis of the dry powder coating were 15% $Al_2O_3$, 24% $SiO_2$, 33% MgO, 18% CaO, 2% $Fe_2O_3$, 3% C, 5% $Na_2O$ were pulverized to 120 mesh or less separately, a mixture can be obtained by blending above components. Subsequently, water was added thereto to adjust the final density of the coating slurry to 1,500 kg/m3, thereby the high temperature antioxidation coating of Example 2 was obtained.

The coating of Example 2 was sprayed onto the surface of GCr15SiMn steel at 1,000° C. in the same manner as in Example 1, thereby a gray protective layer was immediately formed thereon. After heat treatment at 1,200° C. for 2 hours, the steel having a protective coating layer formed from the coating of Example 2 had a much thinner thickness of iron scale than the steel without a protective coating layer, and had a reduced oxidation loss by 70% or more. Furthermore, the coating layer can peel spontaneously from the substrate surface after the steel slab was discharged from the heating furnace, thereby the substrate surface thus obtained is uniform and clean, leaving no residue.

EXAMPLE 3

Magnesite powder, diatomite, iron scale, industrial aluminum powder, polyvinyl alcohol and aluminum phosphate were mixed together in which the chemical compositions on the basis of the dry powder coating were 25% $Al_2O_3$, 39% $SiO_2$, 15% MgO, 5% $P_2O_5$, 8% CaO, 5% $Fe_2O_3$, 3% C. The resultant mixture was pulverized to 150 mesh, and then water was added with uniform stirring to adjust the final density of the coating slurry to 1,300 kg/m3, thereby the high temperature antioxidation coating of Example 3 was obtained.

The coating of Example 3 was sprayed onto the surface of 20CrMnTi steel at 900° C. in the same manner as in Example 1, thereby a gray protective layer was immediately formed thereon. After heat treatment at 1,280° C. for 5 hours, the steel having a protective coating layer formed from the coating of Example 3 had a much thinner iron scale than the steel without a protective coating layer, and had a reduced oxidation loss by 50% or more. Furthermore, the coating layer can peel spontaneously from the substrate surface after the steel slab was discharged from the heating furnace, thereby the substrate surface thus obtained is uniform and clean, leaving no residue.

EXAMPLE 4

Industrial magnesia, mica, red mud, industrial aluminum powder, polyvinyl alcohol and borax were mixed together in which the chemical compositions on the basis of the dry powder coating were 18% $Al_2O_3$, 22% $SiO_2$, 30% MgO, 12% $B_2O_3$, 7% CaO, 2% $Fe_2O_3$, 2% C, 7% $Na_2O$. The resultant mixture was subsequently pulverized to 100 mesh or less and then diluted by adding water, with the ratio of 1:4 (the ratio of powder and water) to adjust the final density of the coating slurry to 1,400 kg/m3 under uniform stirring, thereby the high temperature antioxidation coating of Example 4 was obtained.

The coating of Example 4 was coated onto the surface of A36 steel at 600° C., thereby a gray protective layer was immediately formed thereon. After heat treatment at 1,300° C. for 3 hours, the steel having a protective coating layer formed from the coating of Example 4 had a much thinner iron scale than the steel without a protective coating layer, and had reduced oxidation loss by 60% or more. Furthermore, the coating layer can peel spontaneously from the substrate surface after the steel slab was discharged from the heating furnace, thereby the substrate surface thus obtained is uniform and clean, leaving no residue.

EXAMPLE 5

Magnesite powder, rectorite, iron scale, industrial aluminum powder, sodium carboxymethyl cellulose and soluble glass were mixed together in which the chemical compositions on the basis of the dry powder coating were 16% $Al_2O_3$, 24% $SiO_2$, 32% MgO, 13% CaO, 5% $Fe_2O_3$, 4% C, 6% $Na_2O$. Subsequently, the resultant mixture was pulverized to 150 mesh and then diluted by adding water, with the ratio of 1:3 (the ratio of powder and water) to adjust the final density of the coating slurry to 1,500 kg/m3 under uniform stirring, thereby the high temperature antioxidation coating of Example 5 was obtained.

The coating of Example 5 was coated onto the surface of Q-235B steel at 400° C., thereby a gray protective layer was immediately formed thereon. After heat treatment at 1,200° C. for 6 hours, the steel having a protective coating layer formed from the coating of Example 5 had a much thinner iron scale than the steel without a protective coating layer, and had a reduced oxidation loss by 75% or more. Furthermore, the coating layer can peel spontaneously from the substrate surface after the steel slab was discharged from the heating furnace, thereby the substrate surface thus obtained is uniform and clean, leaving no residue.

EXAMPLE 6

Dolomite powder, diatomite, iron scale, red mud, industrial aluminum powder, sodium carboxymethyl cellulose and borax were mixed together in which the chemical compositions on the basis of the dry powder coating were 32% Al2O3, 30% SiO2, 12% MgO, 7% B2O3, 4% CaO, 8% Fe2O3, 1% C, 6% Na2O. Subsequently, the resultant mixture was pulverized to 150 mesh and then mixed with water under uniform stirring to adjust the final density of the coating slurry to 1,500 kg/m3, thereby the high temperature antioxidation coating of Example 6 was obtained.

The coating of Example 6 was coated onto the surface of 42CrMo steel at 700° C., thereby a gray protective layer was immediately formed thereon. After heat treatment at 1,100° C. for 2 hours, the steel having a protective coating layer formed from the coating of Example 6 had a much thinner iron scale than the steel without a protective coating layer, and had a reduced oxidation loss by 70% or more. Furthermore, the coating layer can peel spontaneously from the substrate surface after the steel slab was discharged from the heating furnace, thereby the substrate surface thus obtained is uniform and clean, leaving no residue.

EXAMPLE 7

Industrial magnesia, diatomite, iron scale, red mud, industrial aluminum powder, polyvinyl alcohol and aluminum triphosphate were mixed together in which the chemical compositions on the basis of the dry powder coating were 25% Al2O3, 36% SiO2, 10% MgO, 7% P2O5, 5% CaO, 12% Fe2O3, 2% C, 3% Na2O. Subsequently, the resultant mixture was pulverized to 150 mesh and then mixed with water to adjust the final density of the coating slurry to 1,400 kg/m3 under uniform stirring, thereby the high temperature antioxidation coating of Example 7 was obtained.

The coating of Example 7 was coated onto the surface of Q195 steel at normal temperature, thereby a gray protective layer was immediately formed thereon after drying. After heat treatment at 1,300° C. for 3 hours, the steel having a protective coating layer formed from the coating of the Example 7 had a much thinner iron scale than the steel without a protective coating layer, and had a reduced oxidation loss by 65% or more. Furthermore, the coating layer can peel spontaneously from the substrate surface after the steel slab was discharged from the heating furnace, thereby the substrate surface thus obtained is uniform and clean, leaving no residue.

EXAMPLE 8

Industrial magnesia, vermiculite, iron scale, red mud, industrial aluminum powder, polyvinyl alcohol, aluminum phosphate and soluble glass were mixed together in which the chemical compositions on the basis of the dry powder coating were 22% Al2O3, 35% SiO2, 13% MgO, 5% P2O5, 6% CaO, 15% Fe2O3, 1% C, 3% Na2O. Subsequently, the resultant mixture was pulverized to 200 mesh and then mixed with water to adjust the final density of the coating slurry to 1,400 kg/m3 under uniform stirring, thereby the high temperature antioxidation coating of Example 8 was obtained.

The coating of Example 8 was coated onto the surface of Q-235B steel at normal temperature, thereby a gray protective layer was immediately formed thereon after drying. After heat treatment at 1,250° C. for 2 hours, the steel having a protective coating layer formed from the coating of Example 8 had a much thinner iron scale than the steel without a protective coating layer, and had a reduced oxidation loss by 80%. Furthermore, the coating layer can peel spontaneously from the substrate surface after the steel slab was discharged from the heating furnace, thereby the substrate surface thus obtained is uniform and clean, leaving no residue.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. An antioxidation coating for steel, characterized that said coating is a slurry prepared by mixing magnesian mineral, layered silicate, metallurgical solid waste, aluminum powder, organic thickener and inorganic binder as primary raw materials with water, and comprises following chemical components on the basis of the coating in dry powder:

| | |
|---|---|
| $Al_2O_3$ | 15~32 wt % |
| $SiO_2$ | 20~40 wt % |
| MgO | 10~35 wt % |
| $B_2O_3$ | 0~20 wt % |
| $P_2O_5$ | 0~10 wt % |
| CaO | 4~15 wt % |
| $Fe_2O_3$ | 2~20 wt % |
| C | 1~5 wt % |
| $Na_2O$ | 0~10 wt % | the density of the coating ranges from 1,100~1,500 kg/m$^3$.

2. The antioxidation coating for steel of claim 1, characterized that said magnesian mineral is selected from one or more of magnesite powder, dolomite powder, industrial magnesia.

3. The antioxidation coating for steel of claim 1, characterized that said metallurgical solid waste is one or more of iron scale, red mud.

4. The antioxidation coating for steel of claim 1, characterized that said organic thickener is one or more of carboxymethyl celluloses, polyvinyl alcohols.

5. The antioxidation coating for steel of claim 1, characterized that said layered silicate comprises one or more of vermiculite, rectorite, diatomite, mica.

6. The antioxidation coating for steel of claim 1, characterized that said raw materials each have the particle size of 100 mesh or less.

7. A method for preparing the antioxidation coating for steel of claim 1, comprising: determining the blending ratio of the raw materials according to the required chemical components, formulating powder of 100 mesh or less by mixing, blending uniformly and then adding water to form a slurry with density of 1,100~1,500 kg/m$^3$.

8. The method of claim 7, wherein said magnesian mineral is selected from one or more of magnesite powder, dolomite powder, industrial magnesia.

9. The method of claim 7, wherein said metallurgical solid waste is one or more of iron scale, red mud.

10. The method of claim 7, wherein said organic thickener is one or more of carboxymethyl celluloses, polyvinyl alcohols.

11. The method of claim 7, wherein said layered silicate comprises one or more of vermiculite, rectorite, diatomite, mica.

12. A method for protecting steel against oxidation in high-temperature treatment, comprising: applying the antioxidation coating for steel of claim 1 to the surface of the steel which is obtained from steel-making working procedure and subsequently charged into a heating furnace, and forming a continuous protective layer on the steel surface by said coating.

13. The antioxidation method of claim 12, wherein said antioxidation coating is sprayed onto the surface of the steel substrate having a surface temperature of no more than 1000° C. by means of a spray equipment disposed in the forepart of the heating furnace.

14. The antioxidation method of claim 12, wherein the steel coated with said antioxidation coating is subjected to heat treatment in the heating furnace at 800~1300° C. for 2~10 hours.

15. The antioxidation method of claim 12, wherein said steel is plain carbon steel or alloy steel.

* * * * *